United States Patent
Novotny et al.

(10) Patent No.: US 11,816,127 B2
(45) Date of Patent: Nov. 14, 2023

(54) QUALITY ASSESSMENT OF EXTRACTED FEATURES FROM HIGH-DIMENSIONAL MACHINE LEARNING DATASETS

(71) Applicant: International Business Machines Corporation, Armonk, NY (US)

(72) Inventors: Petr Novotny, Mount Kisco, NY (US); Aindrila Basak, Edmonton (CA); Shaikh Shahriar Quader, Scarborough (CA); Horst Cornelius Samulowitz, Armonk, NY (US); Chad Marston, Bolton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 17/186,116

(22) Filed: Feb. 26, 2021

(65) Prior Publication Data

US 2022/0292107 A1 Sep. 15, 2022

(51) Int. Cl.
*G06F 16/26* (2019.01)
*G06F 16/215* (2019.01)
*G06N 20/00* (2019.01)

(52) U.S. Cl.
CPC .......... *G06F 16/26* (2019.01); *G06F 16/215* (2019.01); *G06N 20/00* (2019.01)

(58) Field of Classification Search
CPC ............................. G06F 16/26; G06F 16/215
See application file for complete search history.

(56) References Cited

U.S. PATENT DOCUMENTS

| | | | |
|---|---|---|---|
| 8,751,273 B2 | 6/2014 | Pinto et al. | |
| 2011/0246409 A1 | 10/2011 | Mitra | |
| 2015/0074130 A1 | 3/2015 | Kimmel et al. | |
| 2018/0144518 A1* | 5/2018 | Vlassis | G06F 17/18 |
| 2018/0268293 A1 | 9/2018 | Noda | |
| 2019/0304079 A1* | 10/2019 | Min | G06N 3/08 |
| 2021/0010839 A1* | 1/2021 | Garoon | G06N 5/04 |
| 2021/0247534 A1* | 8/2021 | Bø | G01V 1/302 |
| 2022/0222924 A1* | 7/2022 | Pan | G06V 10/82 |

FOREIGN PATENT DOCUMENTS

| | | |
|---|---|---|
| CN | 108845974 A | 11/2018 |
| EP | 2076860 B1 | 11/2016 |
| WO | WO 2019/009912 A1 | 1/2019 |
| WO | WO 2020/190176 A1 | 9/2020 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Grace Park
(74) *Attorney, Agent, or Firm* — Peter Edwards; MCGINN I.P. LAW GROUP, PLLC.

(57) ABSTRACT

A quality determination method, system, and computer program product that includes performing a dimensionality reduction on a high-dimensional dataset to form a dimensional-reduced dataset and determining, using a machine learning tool executed on a computing device, a quality of the dimensional-reduced dataset via a review of an extracted feature extracted from the dimensional-reduced dataset.

18 Claims, 11 Drawing Sheets

100

Proactively Guided Identification of Representative Data Points from the Animals Dataset

QUALITY ASSESSMENT OF EXTRACTED FEATURES FROM HIGH-DIMENSIONAL MACHINE LEARNING DATASETS

BACKGROUND

The present invention relates generally to a quality determination method for a dimension reduction (DR) technique, and more particularly, but not by way of limitation, to a system, method, and computer program product for determining a quality of extracted features from a high-dimensional machine learning dataset.

When a dataset, especially a complex industrial dataset, has too many columns (i.e., features) to fit in the computer screen (e.g., display), it is challenging for data scientists to analyze the underlying patterns of the data and to obtain insights from it.

In order to address this challenge, conventional techniques have considered using Dimensionality Reduction (DR) techniques to transform high dimensional (i.e., many columns) data into lower dimensions (i.e., fewer columns).

However, the DR process discards information. Thus, it is desirable that, after applying a DR algorithm, much of the structure of the original data is preserved in the lower dimension(s) (i.e., the data-points that were closer to each other in the original dataset remain closer in the lower dimension(s)). Likewise, the data-points that are far from each other in the higher dimension remain relatively far in the lower dimension.

Although popularly used in big-data analytics, dimensionality reduction is a complex, black-box technique whose outcome is difficult to interpret and evaluate. In some recent conventional approaches, a number of quantitative and visual methods has been proposed for analyzing low-dimensional embeddings. On the one hand, the quantitative methods associate numeric identifiers to the qualitative characteristics of these embeddings. And, on the other hand, the visual techniques allow users to interactively explore these embeddings and make decisions based thereon.

However, in the former case, users do not have control over the analysis, and the latter case leaves the assessment decisions entirely to the user's perception and expertise.

The inventors have realized a problem in the art in that, like machine learning algorithms, the DR algorithms are a black box solution to most users. After reducing the dimension of a high-dimensional dataset, there is a lack of a systematic approach to examine and measure the information loss at a local neighborhood of a low-dimensional representation. Indeed, there has been no systematic way of knowing what information was lost in applying the DR algorithm. Moreover, DR algorithms may not be familiar to many users and indeed one algorithm for all users/applications may not be beneficial. Indeed, the DR algorithm selected may not be the best one for the specific problem/application.

SUMMARY

Thus, the inventors have considered a technical solution to the technical problem in the conventional techniques by introducing a novel technique via a practical application thereof that can interpret a quality of the extracted features from any dimension reduction technique.

That is, embeddings are low-dimensional representations of high-dimensional data that are obtained using the DR. The DR algorithms transform high-dimensional data into embeddings while attempting to maximally preserve their structural properties. Most DR algorithms identify the structure of the original data using the relative proximities among their data-points. DR, as a transformation technique, not only reduces the computational overhead of high-dimensional data analysis, but it also makes the visualization of such datasets possible with traditional spatial techniques (i.e., 2-dimensional or 3-dimensional plots).

Despite their utility, DR techniques come with a set of major caveats. Firstly, the dimensions derived using such techniques lack a clear-to-interpret mapping with the original features in the data. As a result, novice data analysts are often forced to blindly trust the embeddings without truly understanding the meaning of the projection axes or the positioning of data-points. Secondly, there exists a plethora of DR techniques with their own respective hyperparameter combinations that significantly influence the embedding structure. The non-intuitive nature of these parameters also hinders the interpretability of these techniques making the selection of an appropriate DR algorithm for any dataset, difficult. Thirdly, in most cases, embeddings derived from DR do not make existing errors and distortions prominent to the users. In some cases, where such distortions are visually exposed, the users are not allowed to control or interact with them. All these limitations make an efficient evaluation of embeddings obtained from DR algorithms extremely challenging.

Traditionally, a quality of embeddings is interpreted and evaluated using metric-based quantitative analysis or qualitative and visual analysis of the obtained embedding. Being reliable and repeatable, metric-based quantitative evaluation of embeddings can effectively assist users to compare DR algorithms by associating numeric identifiers to their qualitative characteristics. Nevertheless, such techniques being formally defined, do not allow users to have much control over the analysis process. As a result, users do not get the opportunity to apply their knowledge and expertise in the assessment process.

On the other hand, several qualitative analysis techniques for embeddings allow users to visually explore the neighborhood structures, errors and distortions, and feature variances, within the neighborhoods of the projections. Nevertheless, using such techniques making any decision regarding the best performing DR algorithm in a given context entirely depends on the analyst's perception and understanding of the embeddings. The reason being, such techniques often do not proactively guide users with the analysis process. For example, for very large datasets, most existing techniques do not assist users with the selection of influential data points or representative data subsets that provide a good representation of the original data and can reveal the over-all quality of the embeddings better than other points. As a result, novice data analysts often fail to utilize the complete potential of such interactive visualization techniques when exploring low-dimensional embeddings.

This is important for high-dimensional datasets, which can have, for example, hundreds of features. The feature extraction technique can project the high-dimensional dataset into low-dimensional space. Then, the inventive solution to the technical problem compares the quality of a local neighborhood of the low-dimensional projection. The comparison helps the data science practitioner choose a better feature extraction technique while analyzing the high-dimensional dataset.

Indeed, the invention disclosed herein includes a technical solution to the technical problems discussed above by bridging the gap between traditional techniques for evaluating embeddings. The technical solution includes a visual interactive toolkit that enables a proactively guided and user-driven analysis of preserved structures in any embeddings obtained from any DR algorithm. This is performed by at least a technique (i.e., PG-LAPS (Proactively Guided Local Approximation of Preserved Structure)) that enables a computation of a local-divergence that examines a fidelity of a relative positioning of any individual data-point in an embedding by approximating a neighborhood locally around that point. Moreover, to assist novice users with the analysis process, PG-LAPS proactively guides users with a selection of representative data points from an input dataset.

In an exemplary embodiment, the present invention can provide a computer-implemented quality determination method, the method including performing a dimensionality reduction on a high-dimensional dataset to form a dimensional-reduced dataset and determining, using a machine-learning tool executed on a computing device, a quality of the dimensional-reduced dataset via a review of an extracted feature extracted from the dimensional-reduced dataset.

In another exemplary embodiment, the present invention can provide a computer program product for quality determination, the computer program product comprising a computer-readable storage medium having program instructions embodied therewith, the program instructions executable by a computer to cause the computer to perform performing a dimensionality reduction on a high-dimensional dataset to form a dimensional-reduced dataset and determining, using a machine learning tool executed on a computing device, a quality of the dimensional-reduced dataset via a review of an extracted feature extracted from the dimensional-reduced dataset.

In a third exemplary embodiment, the present invention can provide a quality determination system, said system including a processor and a memory, the memory storing instructions to cause the processor to perform performing a dimensionality reduction on a high-dimensional dataset to form a dimensional-reduced dataset and determining, using a machine learning tool executed on a computing device, a quality of the dimensional-reduced dataset via a review of an extracted feature extracted from the dimensional-reduced dataset.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
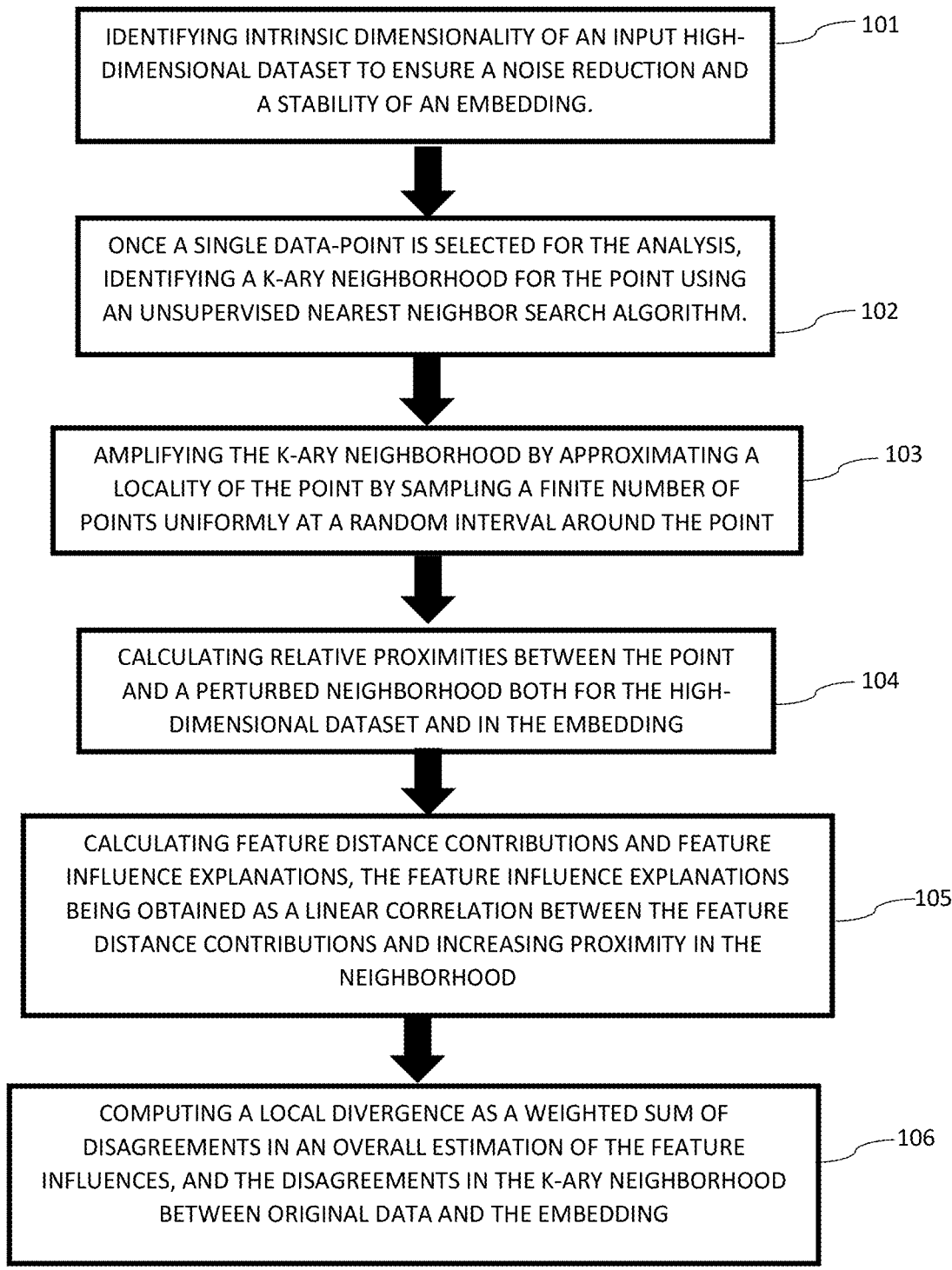
FIG. 1 exemplarily shows a high-level flow chart for a quality determination method 100.
Figure 2:
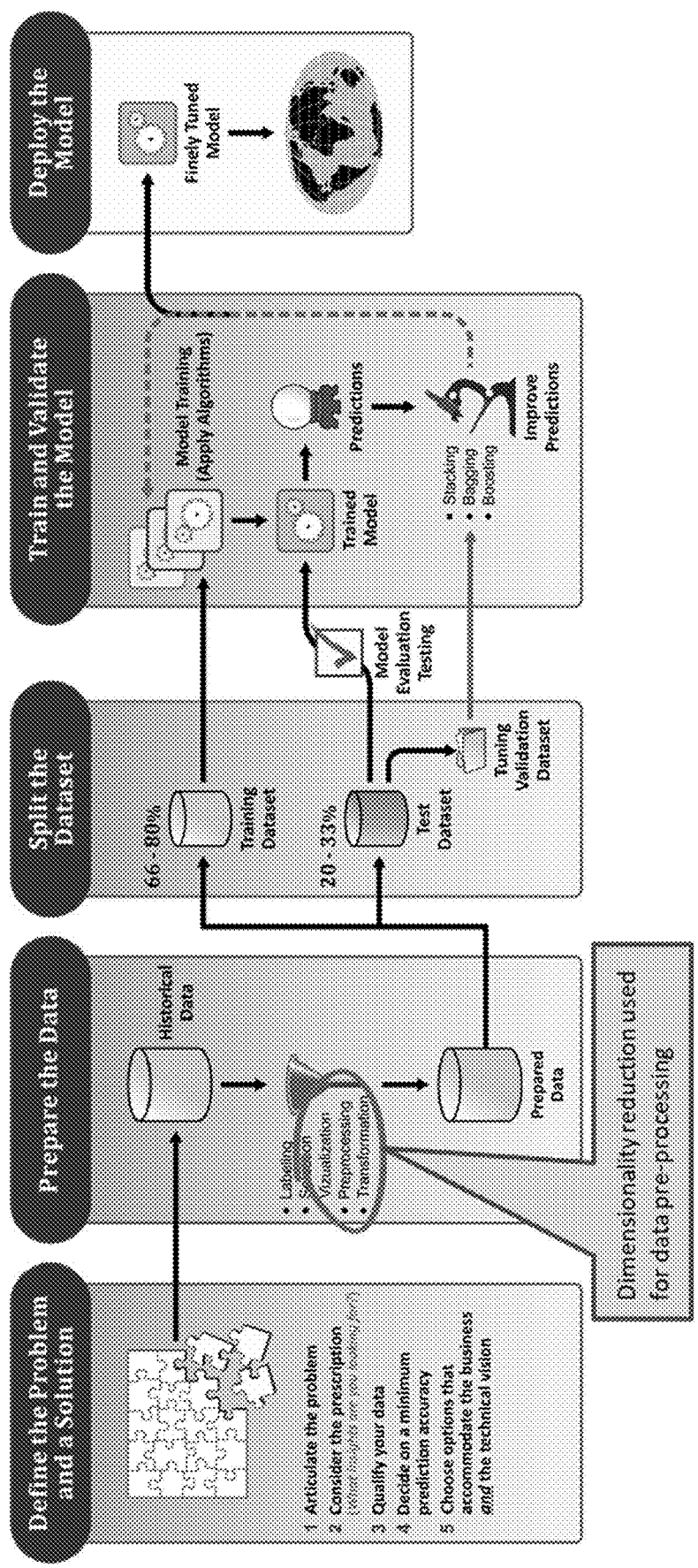
FIG. 2 exemplarily depicts an overview of machine learning with a high-dimensional large data set.

The invention will now be described with reference to FIG. 1-11, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 100 depicted in FIG. 1, the quality determination method 100 includes various steps for a user-driven embedding quality analysis method for proactively guided investigation of the retained local structure in an embedding.

Figure 9:
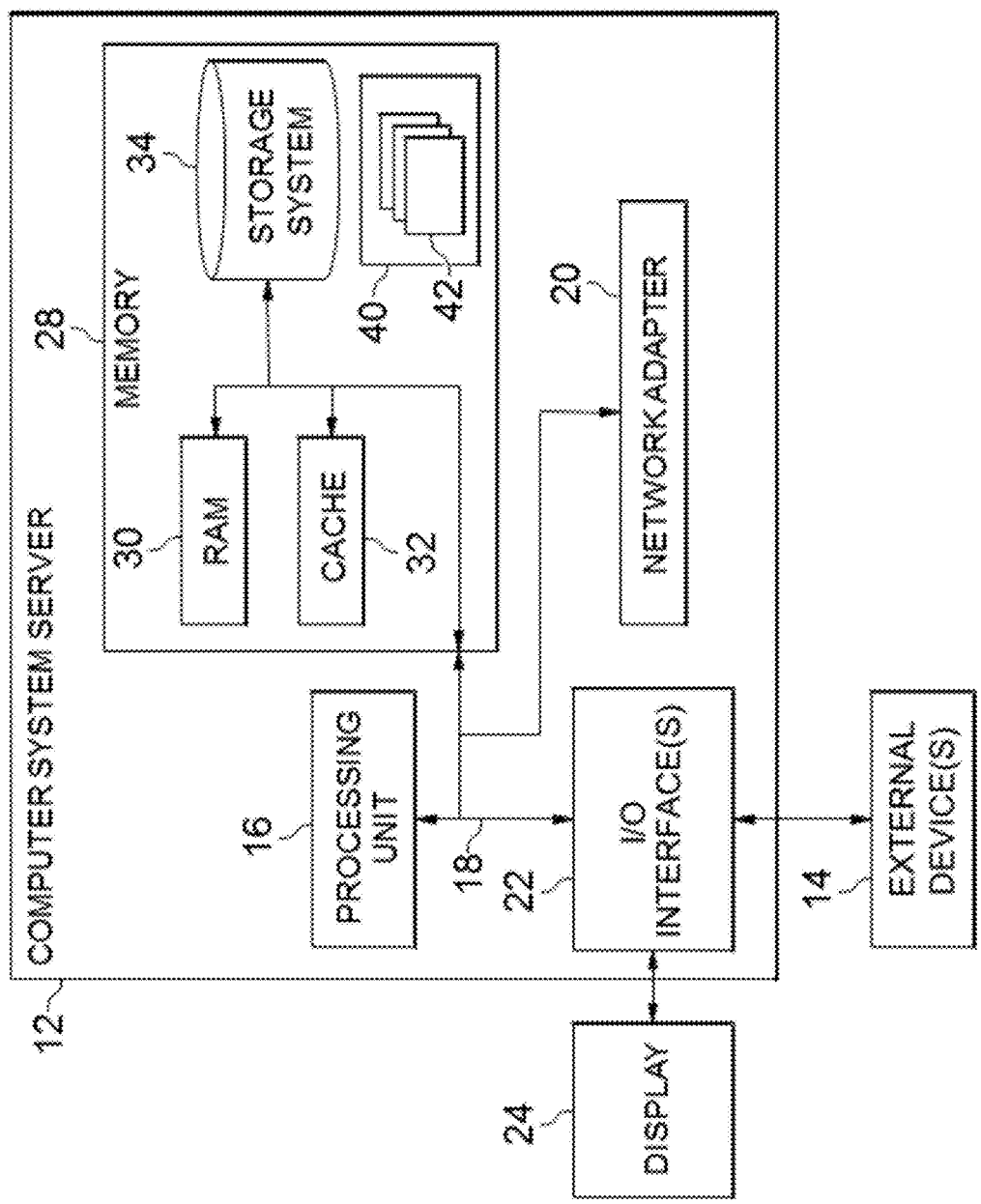
FIG. 9 depicts a cloud computing node 10 according to an embodiment of the present invention.

As shown in at least FIG. 9, one or more computers of a computer system 12 according to an embodiment of the present invention can include a memory 28 having instructions stored in a storage system to perform the steps of FIG. 1.

The quality determination method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as being cognitive.

Although one or more embodiments (see e.g., FIGS. 9-11) may be implemented in a cloud environment 50 (see e.g., FIG. 10), it is nonetheless understood that the present invention can be implemented outside of the cloud environment.

With reference generally to FIGS. 1-8, the invention includes a set of steps that investigates a single data-point in a dataset and enables a user to quantify its preserved local structure using the output metric local-divergence.

Figure 3:
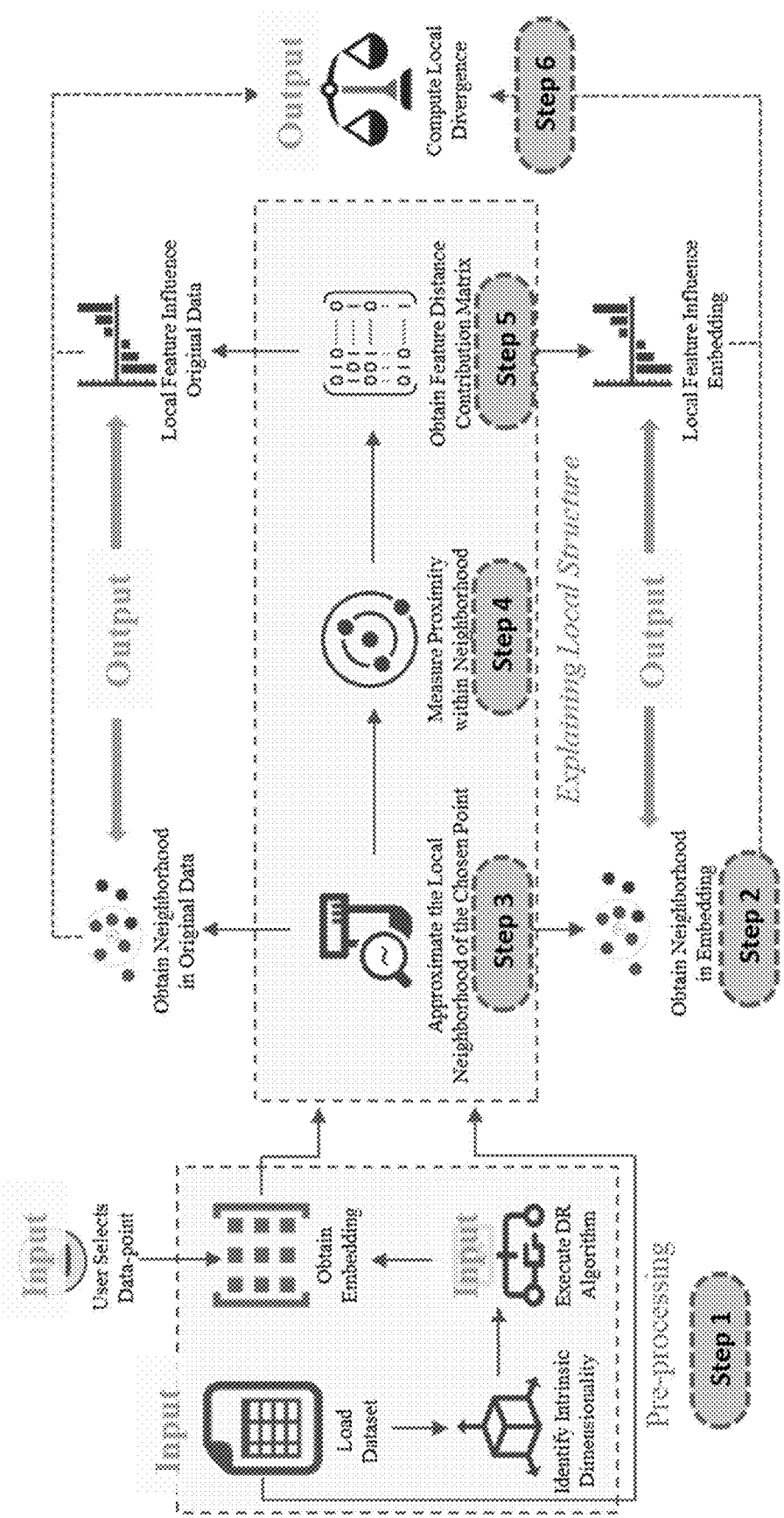
FIG. 3 exemplarily depicts an explanation of a preserved local structure according to the method 100.

With reference to FIGS. 1 and 3, while working with high-dimensional datasets, choosing a best DR technique is important for producing high-quality analytical models (e.g., an ML model). The method 100 provides an improvement by evaluating a quality of local structures that a DR algorithm has produced, providing guidance in choosing important points for evaluating the embeddings, and improving the quality of low dimensional embeddings.

To provide these benefits, in method 100, in step 101, the process starts with an identification of an intrinsic dimensionality of an input high-dimensional dataset to ensure a noise reduction and a stability of an embedding.

More specifically, to avoid the additional noise in the obtained embeddings and also to enhance their stability, the pre-processing of the input data (i.e., load dataset) begins with an estimation of an intrinsic dimensionality d. The invention utilizes a maximum likelihood intrinsic dimensionality estimator for this purpose. The estimator can be defined as equation (1):

$$\hat{d} = \frac{1}{k_2 - k_1 + 1} \sum_{k=k_1}^{k_2} \hat{d}_k \text{ where, } \hat{d}_k = \frac{1}{n} \sum_{i=1}^{n} d_k(X) \quad (1)$$

where, $\hat{d}$ represents a unit vector with an estimation for d and $(k_2-k_1)$ signifies the range of nearest neighbors to consider while estimating d.

At the same time, in step 101, an exhaustive and proactive grid search is also performed to identify an optimum hyperparameter combination(s) for the chosen DR method given the data.

Next, the embedding for the input data is obtained by executing any DR algorithm chosen by the user using the estimated value for d and the identified hyperparameter combinations. It is noted that the DR algorithms are input and the invention can use any set of known or future-developed DR algorithms. The invention is agnostic to the DR algorithms that are loaded into the invention as an input. The invention identifies which DR algorithm is best suited for the load data set (as described later).

Figure 4:
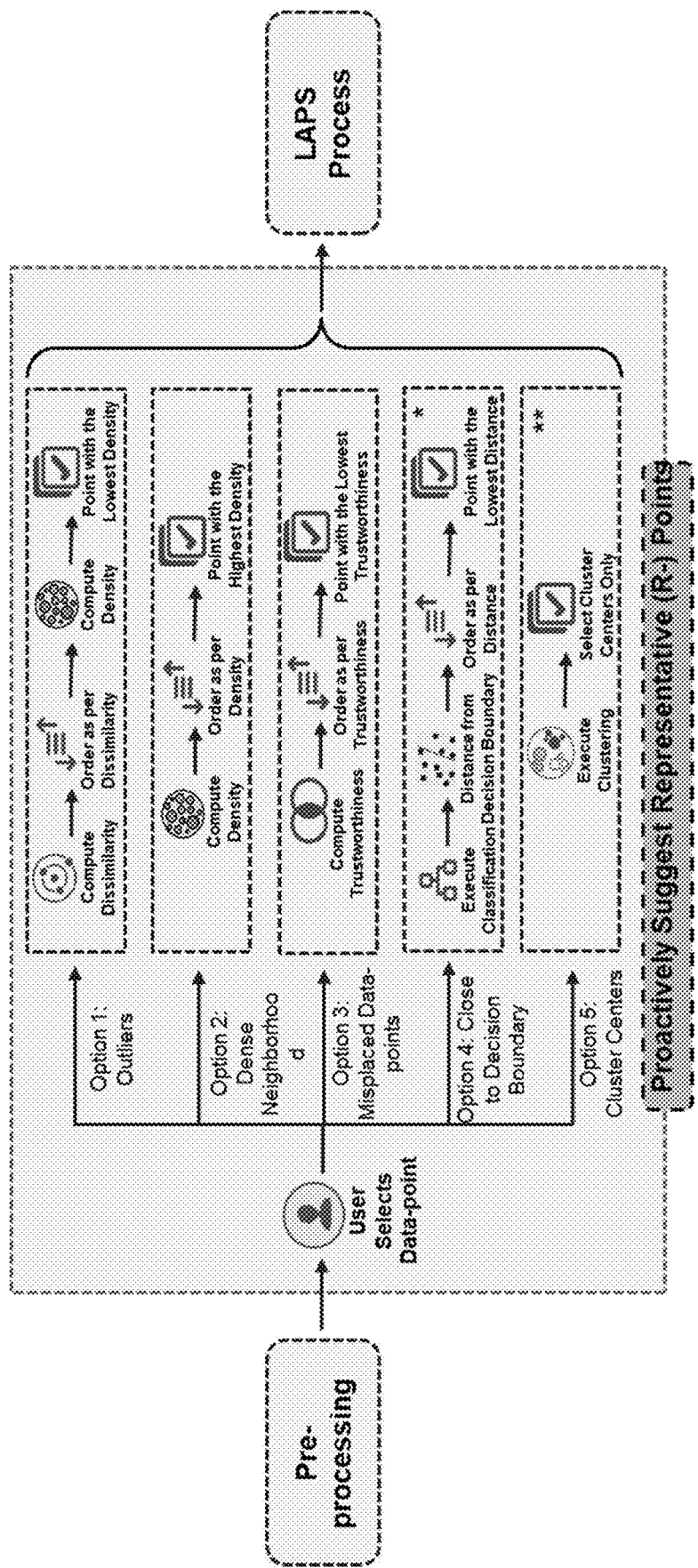
FIG. 4 exemplarily depicts proactive guidance in selection of a representative data point for analysis according to the method 100.

In step 102, a single data-point is selected for analysis via one of a plurality of options (e.g., see the five exemplary options depicted in FIG. 4). Once the single data-point is selected, the K-ary neighborhood for the point is identified using an unsupervised nearest-neighbor search algorithm.

With reference to FIG. 4, the selection of the single data-point is described in detail. The invention suggests a set of representative data-points that might be interesting from five different analytical perspectives. Here, data-points are considered to be interesting if the point (option 1) is an outlier, (option 2) has a highly-dense neighborhood, (option 3) is misplaced (i.e., has false or missing neighbors in the projection), (option 4) is close to the decision boundary, and/or (option 5) is the center of any cluster.

For option 1, the outliers in the original data are identified using a combination of the notions of density and dissimilarity among the data points. Here, at first, the invention measures a pairwise geodesic distance(s) among all data points. The geodesic distance $dist_v$ among any two points $x_i$ and $x_j$ in x, can be defined as equation (2):

$$disl_y(x_i, x_j) = \inf\{L(\sigma)\} \quad (2)$$

where $\inf\{L(\sigma)\}$ represents the infimum over the lengths of all the smooth paths σ connecting the two points $x_i$ and $x_j$.

Next, the invention arranges the points in a descending order of dissimilarity as the neighborhood density of 50% data-points are measured with the maximum dissimilarity. The points with the lowest density are highlighted in the projections as potential outliers in the data.

For option 2, the invention uses, for example, a Density Based Spatial Clustering of Applications with Noise (DB-SCAN) algorithm to compute a density of all data-points and the data points with the highest density are presented to the user based on their chosen threshold.

For option 3, the users are presented with the points with the lowest trustworthiness in each of the embeddings and allows the users to further investigate these points. The metric of trustworthiness quantifies a number of false and missing neighbors for any data-point in its embedding.

For option 4, the data-points with a minimum distance from the decision boundaries are presented as representative points of interest to the users. It is important to note that, this option is only applicable for labelled datasets, where a Support Vector Machine (SVM) is used for multi-class classification in order to measure to the Euclidean distance of all data points from the decision boundaries. Thus, a single data-point may be selected which is relatively "close" or "adjacent" or has a minimum distance from a decision boundary.

For option 5, a K-means clustering technique, for example, is used to present only the cluster centers as representative data points to the users.

As shown in FIG. 4, once a user interactively selects an $x_i \in X$ (either among the proactively guided points or interactively from the dataset) for further analysis, the next steps of the method 100 are initiated.

In step 103, an unsupervised nearest-neighbors search is performed and a local neighborhood is approximated. That is, to amplify its neighborhood structure, a locality of the chosen point from step 102 is approximated by sampling a finite number of points uniformly at random around that point.

For example, via step 103, the invention assists with interpreting a quality of the local neighborhood of the low-dimensional embeddings by comparing with the original representation. This capability is important in choosing the best dimension reduction technique for a given dataset. In principle, the invention can analyze the quality of the low-dimensional embeddings that are produced.

That is, the invention simultaneously identifies the localities around the chosen point $x_i$ and its low-dimensional counterpart $y_i$ using an unsupervised k-nearest neighbor search. For this purpose, the invention uses a ball-tree algorithm, for example. A ball-tree is efficient with a fast discovery of nearest neighbors in high-dimensional manifolds. To assist with the understanding of the future computations, this is formally defined as the identified local neighborhoods of size k for $x_i$ and $y_i$ as equation (3):

$$nn_{x_i} = \{\forall x' \in X | \forall x'' \in X, x' \neq x'' : \pi_i \chi(x') \leq \pi_i \chi(x'')\}$$

$$nn_{y_i} = \{\forall y' \in Y | \forall y'' \in Y, y' \neq y'' : \pi_{y_i}(y') \leq \pi_{y_i}(y'')\} \quad (3)$$

where, $|nn_{x_i}| = |nn_{y_i}| = k$.

Once the indexes of the k-nearest neighbors for both $x_i$ and $y_i$, are identified, the original feature vectors from x for the data-points in $nn_{x_i}$ and $nn_{y_i}$ are combined into two feature vector matrices that are named $Z_{x_i}$ and $Z_{y_i}$ respectively.

For approximating the local neighborhood, the local neighborhood of the point $x_i$ and its low-dimensional counterpart $y_i$ are approximated by sampling a constant number of data-point samples uniformly at random with a normal distribution centered around each $x' \in Z_{x_i}$ and $y' \in Z_{y_i}$. The reason for performing such an approximation is two-fold. Firstly, the process ensures local fidelity by amplifying the locality of the points $x_i$ and $y_i$ without needing to consider an extremely large value2 for k. Secondly, such an approximation also ensures normality in the distribution of the feature values in the neighborhood. The approximated perturbed neighborhoods for $x_i$ and $y_i$ are combined into feature two vector matrices $\overline{Z}_{x_i}$ and $\overline{Z}_{y_i}$ respectively.

In step 104, the relative proximities are calculated between the chosen point and its perturbed neighborhood both for the high-dimensional dataset and in the embedding. The relative proximities $\pi_x i(x')$ and $\pi_{y_i}(y')$ are calculated between the points $x_i$, $y_i$ and their perturbed neighbors respectively. For feature vectors with continuous values, the Euclidean distance is used as the proximity measure. Alternatively, in the case of feature vectors with a mixture of continuous and categorical values, the Gower dissimilarity is used to measure the proximity between them. The Gower dissimilarity can be defined as equation (4):

$$dist_\omega(x_i, x') = \sum_{u=1}^{D} \delta_{x_i x' u} \times dist_{\omega_{x_i x' u}} / \sum_{u=1}^{D} \delta_{x_i x' u} \qquad (5)$$

where u represents an individual feature in $\overline{Z}_{x_i}$. For continuous data, the $dist_\omega$ is calculated as $|x_{iu}-x_u'|/$range (u). For categorical data, $dist_\omega$ is 0 if $x_{iu}=x_u'$, otherwise 1.

In step 105, the feature distance contributions and feature influence explanations are calculated. The feature influence explanations are obtained as a linear correlation between the feature distance contributions and increasing proximity in the neighborhood. Feature influence is related to the determined proximity.

Step 105 computes the influences of the original features in the formation of the neighborhoods of $x_i$ and $y_i$. For this purpose, at first, the invention generates ordered feature-vector matrices $\overline{Z}_{x_i}$ and $\overline{Z}_{y_i}$ from the perturbed neighborhoods of $x_i$ and $y_i$. In these matrices, the invention orders the data vectors in $Z_x i$ and $Z_{y_i}$ according to their descending proximities with $x_i$ and $y_i$ respectively. In parallel, the invention stores the ascending proximity values between $x_i$, $y_i$ and every point in its perturbed neighborhoods (i.e., the actual $\pi_x i(x')$ and $\pi_{y_i}(y')$ values) in two sets namely $\overline{\pi}_{x_i}$ and $\overline{\pi}_{y_i}$. Subsequently, from $\overline{Z}_{x_i}$ and $\overline{Z}_{y_i}$ the invention generates two feature distance contribution matrices $FC_{Z_x,i}$ and $FC_{Z_{y_i}}$. These matrices are built based on the concept of feature distance contribution, that represents a ratio of the differences in each single feature value in the overall distance between two data-points.

Thereafter, as shown in FIG. 3, as the first result of the proposed local quality analysis technique, from $FC_{Z_x,i}$ and $FC_{Z_{y_i}}$, the invention generates feature influence explanations inf $(x_i)$ for $x_i$ and inf $(y_i)$ for $y_i$ using a Pearson's correlation between each column in matrix $FC_{Z_x}$ and set $\overline{\pi}_{x_i}$. Similarly, the invention also computes inf $(y_i)$ from $FC_{Z_{y_i}}$ and $\overline{\pi}_{y_i}$.

It is noted that inf $(x_i)$ and inf $(y_i)$ signify influences of the original features of the dataset on the relative dissimilarities between the data points in the same neighborhood. Features can have either positive, negative, or no influence on the relative proximities among data. While features with positive influences push the data points further and hence, have a positive Pearson's correlation with the increasing pairwise distances among data points in the neighborhood. Features with negative influences bring the datapoints closer to each other and have a negative Pearson's correlation with the same. Similarly, the non-influential features are those that show extremely low or no linear correlation with the increasing pairwise dissimilarities in the neighborhood.

Figure 5:
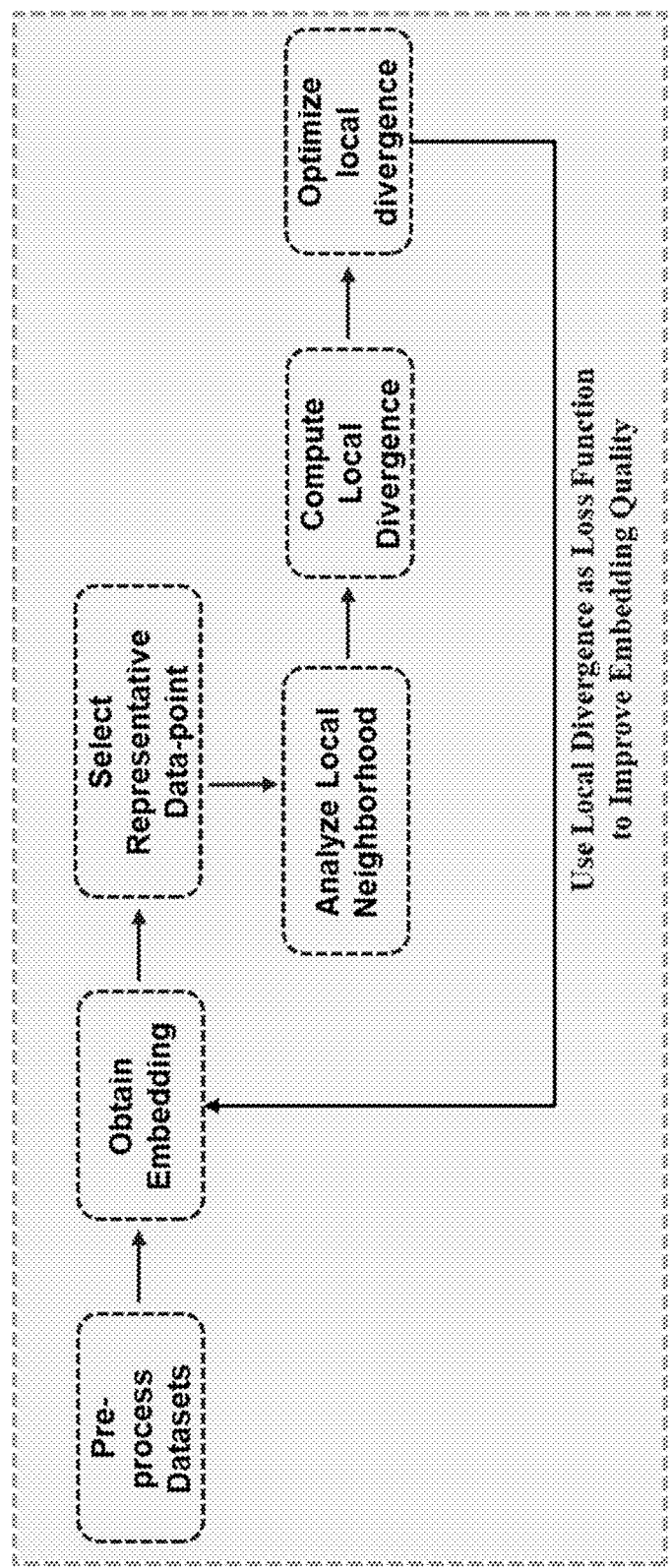
FIG. 5 exemplarily depicts optimization of local divergence for enhanced projections according to the method 100.

In step 106, and with reference to FIG. 5, the local divergence is computed as a weighted sum of the disagreements in the overall estimation of the feature influences, and the disagreements in the neighborhood structures between the original data and the embedding.

That is, the metric local-divergence $\lambda_{x_i}$ for the selected data-point $x_i$ is computed as equation (5):

$$\lambda_{xi} = w_1 \pi_{inf(xi)}(inf(y_i)) + w_2 \frac{nn_{x_i} \cap nn_{y_i}}{|nn_{x_i}|} + w_3 d_{rnn_{x_i} nn_{y_i}} \qquad (5)$$

As shown in equation (5), the local-divergence is composed as a weighted sum of three components. These include:

1. $\pi_{inf(x_i)}$ (inf($y_i$)): This signifies the cosine distance between inf($x_i$) and inf($y_i$) and that represents the discrepancy between the feature influences scores for the neighborhood of $x_i$ in the original dataset versus in the embedding.

2. $nn_{x_i} \cap nn_{y_i}/|nn_{x_i}|$: This represents the false and missing neighbors for $x_i$ in the embeddings. Here the invention computes a ratio between the number of the preserved neighbors with the total number of k nearest-neighbors of $x_i$ considered for the analysis.

3. $d_{rnn_{x_i} nn_{y_i}}$: This represents the difference between the relative orders of neighbors in the neighborhoods of $x_i$ and $y_i$. This component measures whether an embedding can preserve the ordinal relationships among the data points in the original neighborhood.

In equation (5), $w_1$, $w_2$, and $w_3$ signify user-defined (scalar) weights of the three components of $\lambda_{x_i}$, by default in the computations, and are considered each component of local divergence to be equally weighted (i.e., a weight of 0.33). However, during a user-driven computation of local-divergence the users are enabled to alter these weights in any way they deem fit. In either case $w_1$, $w_2$, and $w_3$ sum up to 1.

Indeed, in order to improve the overall projections (i.e., the embeddings), step 106 uses the local divergence score from the embeddings and optimizes it in order to enhance the overall quality of the embeddings via an iterative process where the local-divergence is used as a loss-function.

For example, when the dataset is high-dimensional, instead of choosing a subset of the original features, dimensional reduction technique(s) derives a new set of features, which compresses more information from the high-dimension embeddings. Dimension reduction technique is often chosen while dealing with very high dimensional datasets. At least step 106 provides interpretability of the low dimensional embedding quality and thus assists in choosing the best dimension reduction technique.

Thus, using the method 100, the invention can evaluate and elaborate the retained local structure after Dimensionality Reduction (DR), provide proactive guidance to assist users with the evaluation of the complex process of DR and its outcome, and the new technique is accompanied by a graphical user interface (GUI) (e.g., see FIGS. 6-8) to allow simultaneous comparisons of multiple DR algorithms for the selection of the best algorithm for a specific dataset.

That is, the disclosed invention of method 100 is not a dimension reduction (feature extraction) technique, but rather the method 100 may interpret a quality of the extracted features from any dimension reduction techniques. This is important for a high-dimensional dataset, which can have, for example, hundreds of features. The feature extration technique can project the high-dimensional dataset into a low-dimensional space. Then, the invention can compare the quality of a local neighborhood of the low-dimensional projection. This can help the data science practitioner choose a better feature extraction technique while analyzing high-dimensional dataset. Indeed, the user can determine which algorithm has done the best job in preserving the data in the local neighborhood (i.e., the lower dimension). Moreover, the invention allows the user to see what data/feature is lost and what the best DR algorithm would be for the dataset at hand. That is, the user can how much distortion there has been in the embedding/local neighborhood.

In one embodiment, the quality of the dimensional-reduced dataset is determined based on an analysis of a first dimension reduction (DR) technique used in the dimensionality reduction. And, a second dimension reduction technique can be used when performing the dimensionality reduction, a quality of the second dimension reduction technique can be compared with the quality of the first dimension reduction technique, and, via a graphical user interface, a result of the comparing is displayed. It is noted that the comparison between DR techniques is optional. One can choose to apply a single DR technique on a dataset and evaluate its quality in the low-dimension by comparing with its high-dimensional (original) structure. Optionally, one can compare the performance of multiple DR algorithms; when so doing, you compare two or more DR techniques applied on the same dataset.

For example, there are currently over thirty dimension reduction (DR) techniques available to the data scientists. Not all techniques perform equally for any given dataset. Some techniques do better than the others with a given dataset. If a suboptimal dimension reduction technique is chosen while processing a high-dimensional dataset, then the downstream analytical model will have suboptimal performance. The invention assists the data science practitioner in evaluating the quality of the low-dimensional projection of the high-dimensional dataset. This in turn can help the data science professionals build better analytical models. And, the invention is agnostic to the DR technique (i.e., a new unknown technique can be analyzed with the invention). Thus, the invention can use existing DR algorithms and can scale to use newly created algorithms. In that sense, the invention can be deemed adaptive or dynamic.

In one exemplary use case of the method 100, a dataset is reduced using one of many DR algorithms. The invention can simultaneously compare the multiple DR algorithms to evaluate their outcome on a specific dataset. In other words, for each dataset, a different DR algorithm will be the optimal algorithm. In conventional techniques, one DR algorithm is widely used and loses efficiency on many datasets. The invention is able to evaluate which DR algorithm would be the best to use for the specific dataset while considering cost and efficiency.

If a suboptimal dimension reduction technique is chosen, then the low dimensional representation of the high-dimensional dataset would have already lost important information as part of dimension reduction. Therefore, it is important to find a better dimension reduction technique early on so that the information loss is reduced. This will help build better downstream machine learning models. In one working example, via the method 100, the method 100 determines a best dimension reduction technique for that particular dataset.

That is, from the experimental evaluation, it has been determined that there is not a single best dimension reduction technique. In order to choose the best dimension reduction technique for a given dataset, the invention compares the low dimensional embeddings with their high-dimensional counterparts and help choose the best dimension reduction technique. Better dimension reduction technique tends to assist with building better downstream machine learning models. A suboptimal dimension reduction technique will negatively affect the quality of downstream Machine Learning models. Thus, the invention solves this problem and provides a best fit of a DR technique for each dataset.

Figure 6:
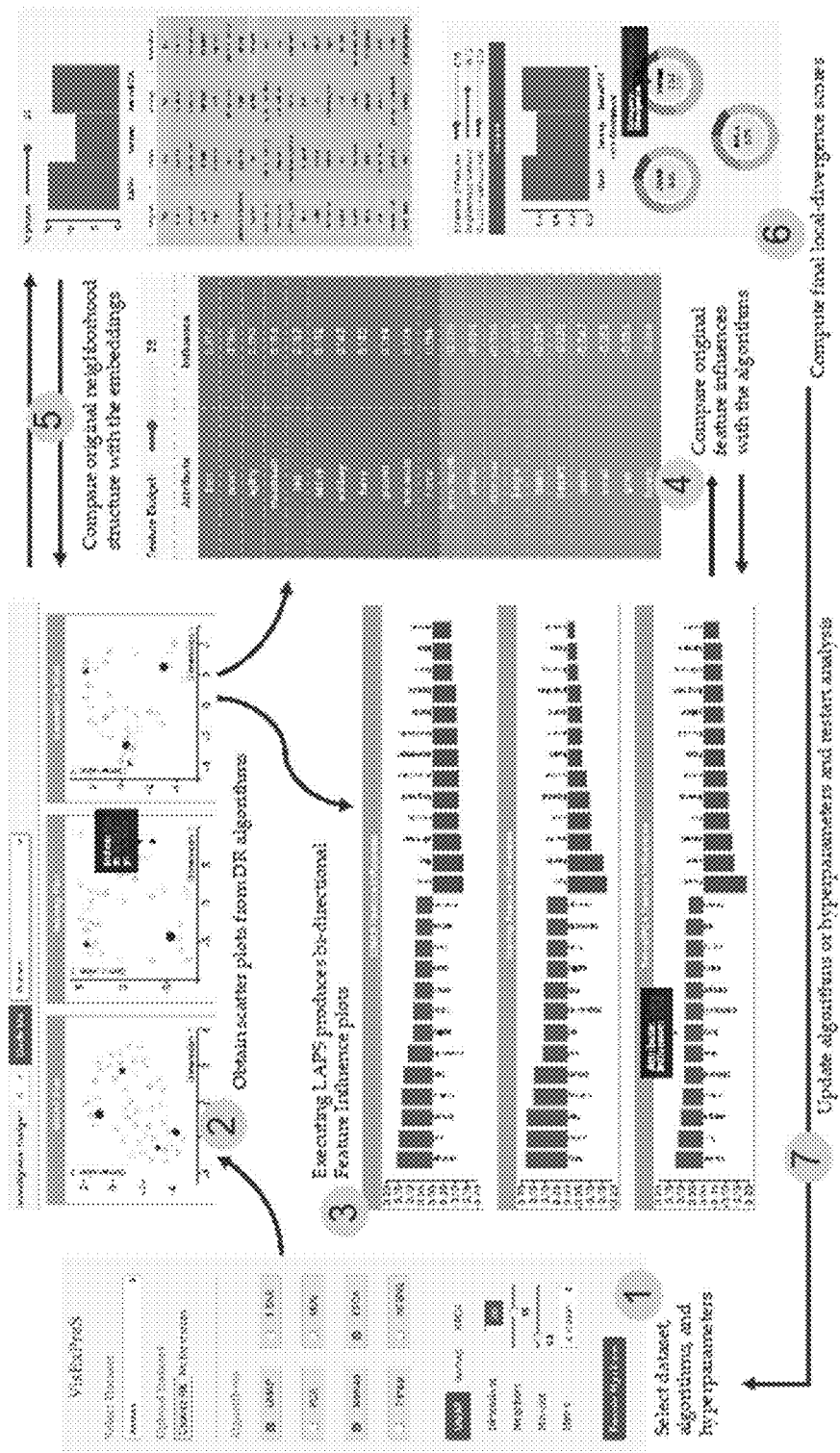
FIG. 6 exemplarily depicts a proactively guided analysis of preserved structure for an animals dataset.
Figure 7:
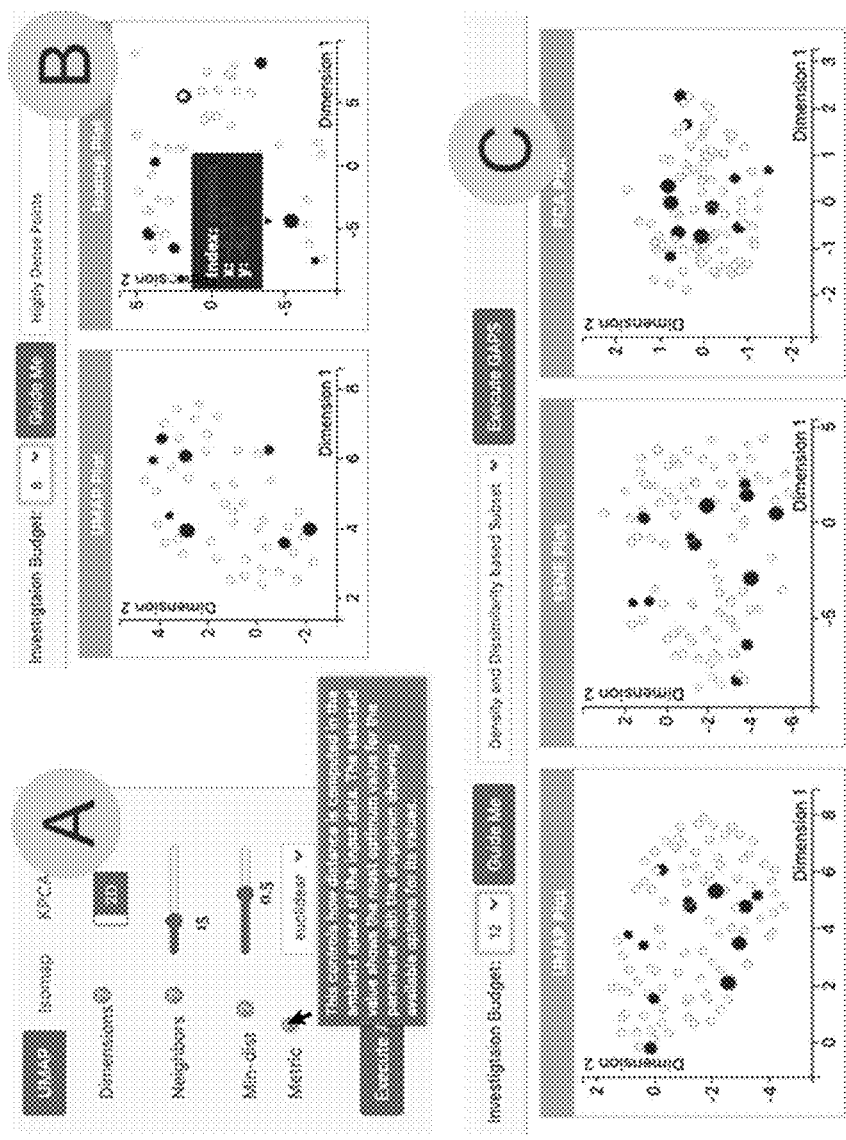
FIG. 7 exemplarily depicts proactively guided identification of representative data points from the animals dataset.
Figure 8:
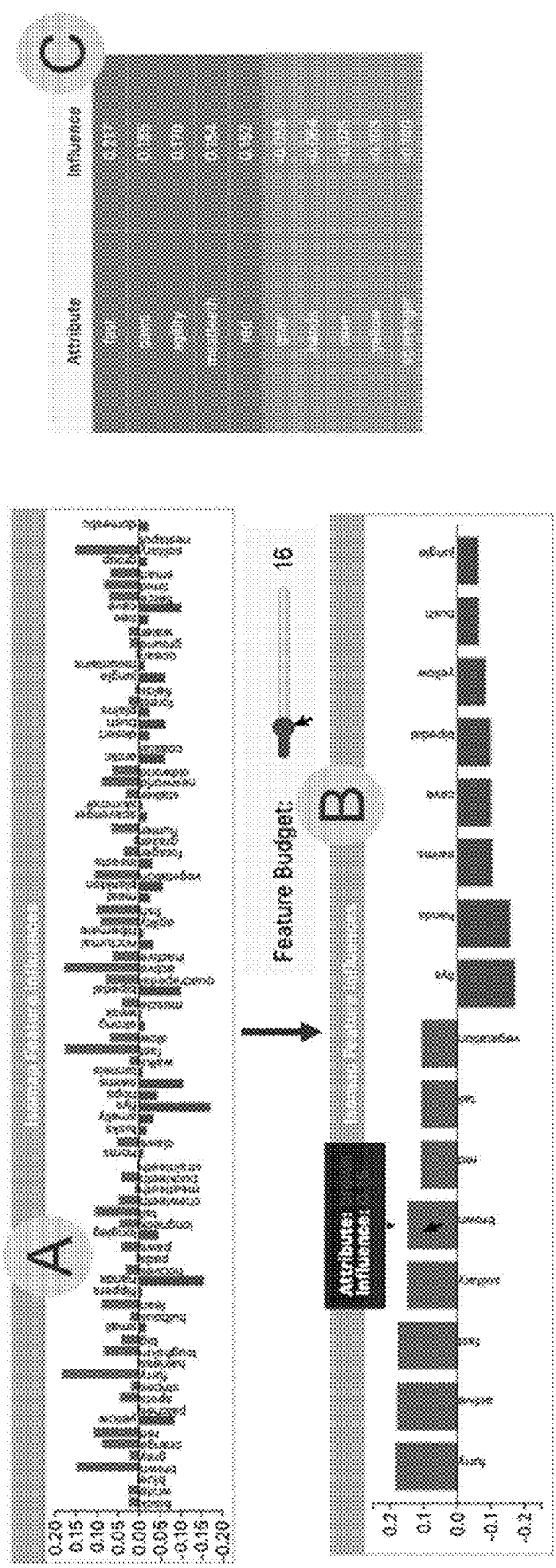
FIG. 8 exemplarily depicts the visual limitations by using an analysis budget for the animals dataset.

With reference to FIGS. 6-8, the exemplary benefits of the claimed invention are depicted. For example, in FIG. 6, presents an example of using the method 100 and the accompanying tool for exploring and evaluating the quality of local structures of low dimensional embedding. This example is using an open-source image dataset that contains 30,475 images of 50 animals that are classified using 85 numeric features. FIG. 6 shows the flow of an analysis on the Animals dataset. In step (1), the user loads the dataset into the tool and selects three DR algorithms that the user wants to apply on the dataset. The tool executes a proactive grid search on the chose DR algorithms for the input dataset and presents some suggestions for the hyperparameter values for the algorithms. The user proceeds with the suggested values for the hyperparameters to the next step. The tool executes the DR algorithms and presents the user with three low-dimensional embeddings, each obtained with one of the three chosen DR algorithms. The tool next provides proactive guidance in selecting representative data points from five different categories as explained in this application. The user explores a few outliers from the dataset. The tool identifies dolphin, tiger, sheep, and fox to be the outliers. The user chooses to investigate the point fox for further analysis. Now, upon executing LAPS on point fox, the tool interface shows the user with the neighborhood for the chosen point on the scatter plots as the feature influence explanation bar-graphs for the point are shown just below the scatter plots (Step (3) in the figure). Here, the tool allows Alice to compare the neighborhood and feature influences for fox in the embeddings and in the original dataset. Here, the user notices that the original feature influences presented in the right-sidebar (step (4)) show that for fox, the features fast, paws, agility, meatteeth, red, active, furry, and solitary have the highest positive influences. On the other hand, features scavenger, yellow, cave, and hands have the most negative influences on its neighborhood structure. Some features such as tunnel, bipedal, and forager have little or no influence on the relative proximities in the neighborhood of fox. The user notices that Isomap, one of the three chosen DR algorithms, has preserved the positive feature influences for features such as fast, furry, red, agility, and solitary. Also, in terms of the most negative feature influences, Isomap has preserved the influences of hands, yellow, and cave. Upon comparing the neighborhood of fox in the original dataset with the neighborhoods in the embeddings, in step (5), the user notices among the twenty neighbors visible in the scatter plots, Isomap has only nine false and missing neighbors in its embedding. The two remaining algorithms have completely messed up the orders of the points in the neighborhoods. In step (6), the user computes the local-divergence scores for the chosen point. The runs the analysis for 50 points in the dataset and notices that on average Isomap has performed better than all other algorithms. So, the user chooses to execute Isomap on her dataset prior to training her predictive model with the data.

FIG. 7 shows the proactive guidance another method and the accompanying tool provides to the user during the analysis with the high-dimension dataset and its low-dimensional counterpart. In step A, the tool provides guidance in choosing optimized values for the chosen DR algorithms. In this example, the user has chosen three DR algorithms. So, step A has three tabs, one tab per chosen DR algorithm. Steps A and B provide guidance in choosing individual points from one of the give categories: e.g., highly dense points, outliers. Also, the user can select their investigation budget for individual points. e.g., analyzing eight points, one at a time.

FIG. 8 exemplary depicts how the method 100 compares the feature influences between the (low-dimensional) embeddings and the original dataset. Part A shows the influences of the full set of features in the formation of the neighborhood structure (low-dimensional embedding) of a chosen point. The neighborhood structure means who are neighbors of the chosen points and their relative distance and from the chosen point. If the number of original features is high, the user can choose to analyze the influence of the fewer original features by adjusting the feature budget. In this example, the user has chosen to analyze the influence of the top 16 original features on the low-dimensional embedding. Alongside the influences of features on the low-dimensional embeddings, in part C, the user interface shows the influence of the features on the formation of neighborhood in the original high-dimensional representation. This helps the users to compare the features' influence between low and high dimensional representations for the chosen point and its neighborhood structure.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 9, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 10:
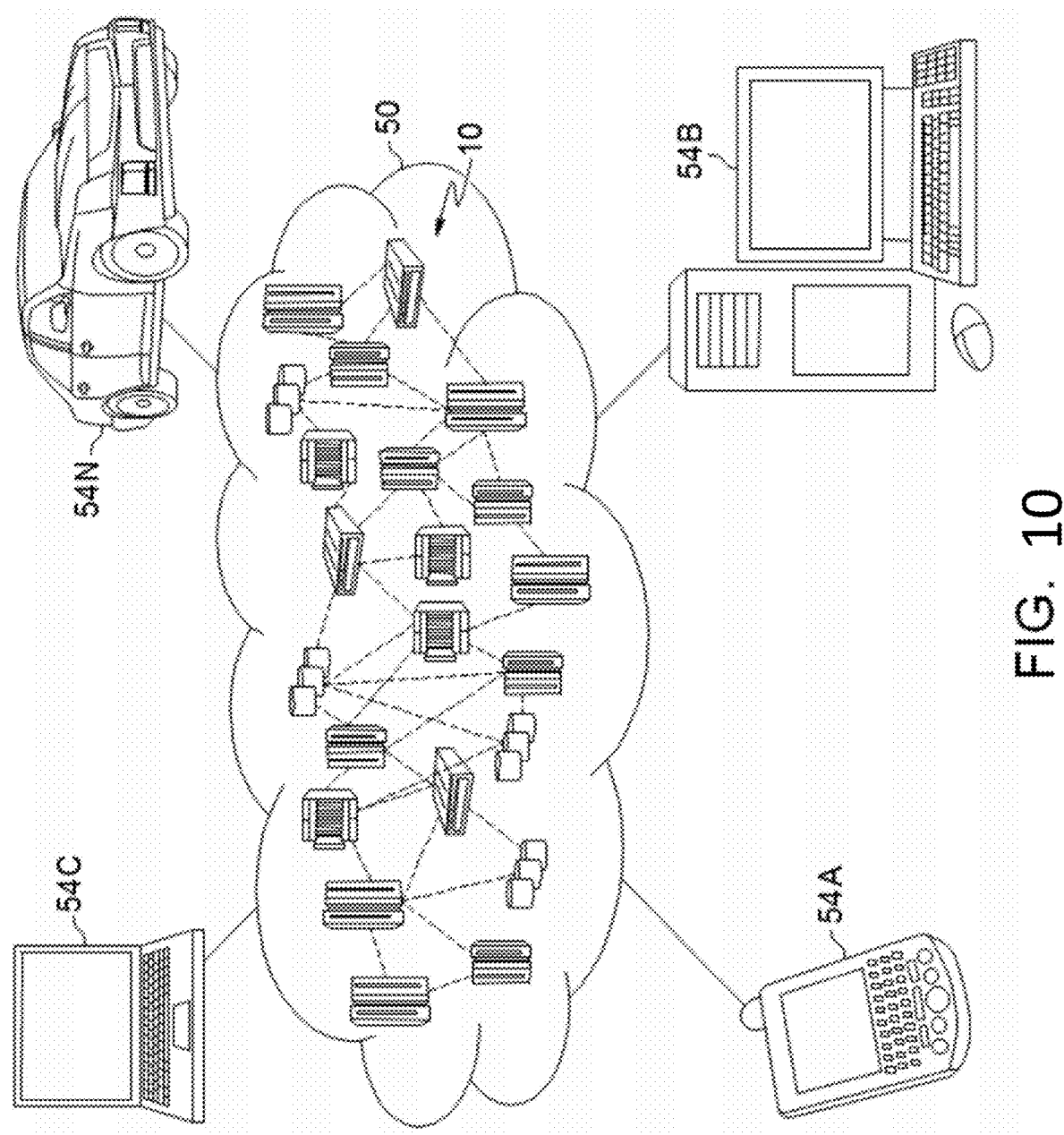
FIG. 10 depicts a cloud computing environment 50 according to an embodiment of the present invention.

Referring now to FIG. 10, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 10 are intended to be illustrative only and that computing nodes 10 and cloud computing environment 50 can communicate with any type of computerized circuit over any type of network and/or network addressable connection (e.g., using a web browser).

Figure 11:
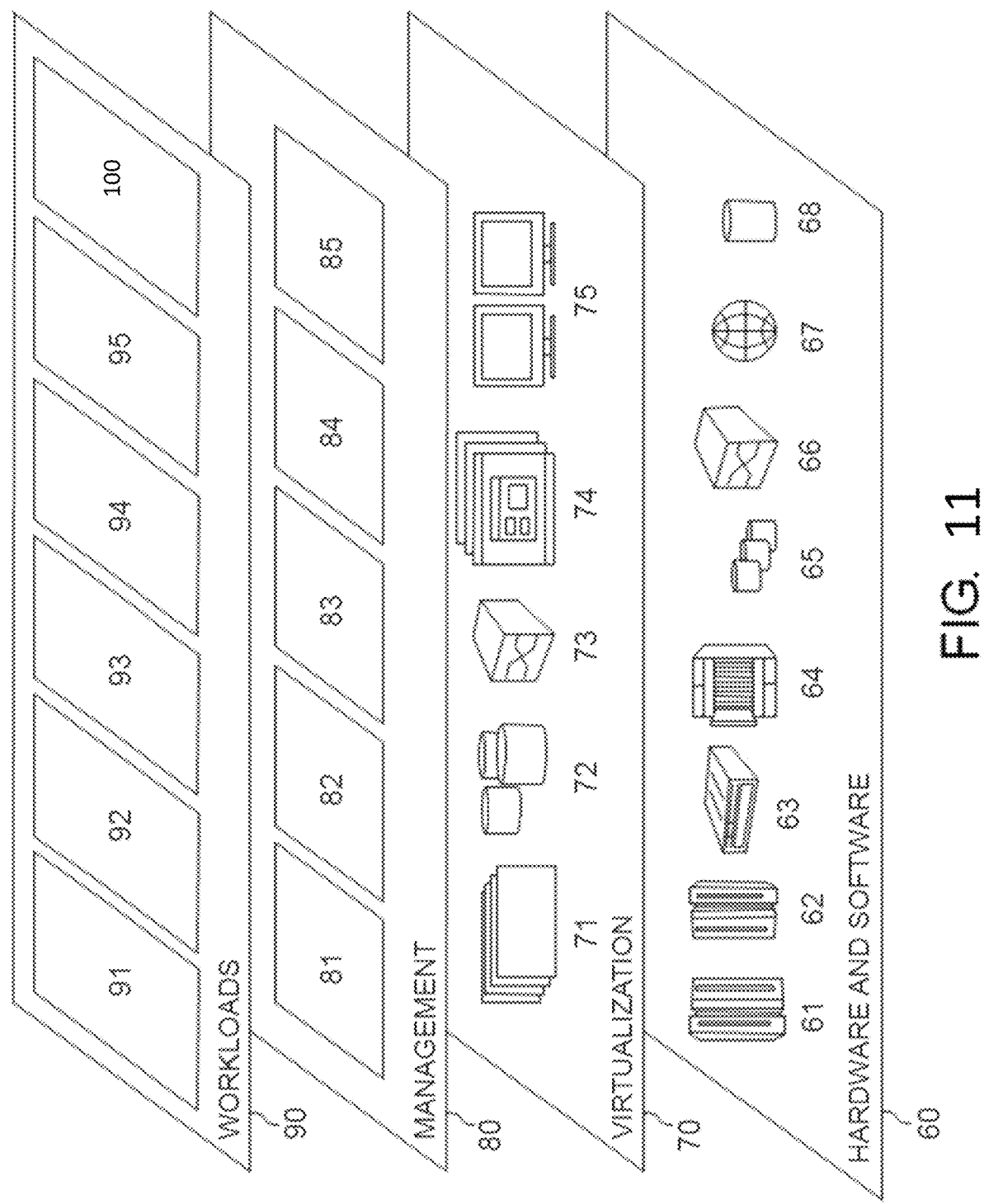
FIG. 11 depicts abstraction model layers according to an embodiment of the present invention.

Referring now to FIG. 11, an exemplary set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the quality determination method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented quality determination method, the method comprising:
    performing a dimensionality reduction on a high-dimensional dataset to form a dimensional-reduced dataset;
    calculating relative proximities between a selected single data-point and a perturbed neighborhood both for the high-dimensional dataset and in an embedding; and
    determining, using a machine-learning tool executed on a computing device, a quality of the dimensional-reduced dataset based on the relative proximities via a review of an extracted feature extracted from the dimensional-reduced dataset,
    wherein the determining the quality further comprises:
        identifying a K-ary neighborhood for the single data-point using an unsupervised nearest-neighbor search algorithm;
        amplifying the K-ary neighborhood by approximating a locality of the point by sampling a finite number of points uniformly at a random interval around the single data-point; and
        calculating feature distance contributions and feature influence explanations, the feature influence explanations being obtained as a linear correlation between the feature distance contributions and increasing proximity in the neighborhood.

2. The computer-implemented method of claim 1, wherein the quality of the dimensional-reduced dataset is determined based on an analysis of a first dimension reduction (DR) technique used in the dimensionality reduction.

3. The computer-implemented method of claim 2, further comprising:
    using a second dimension reduction technique when performing the dimensionality reduction;
    comparing a quality of the second dimension reduction technique with the quality of the first dimension reduction technique; and
    displaying, via a graphical user interface, a result of the comparing.

4. The computer-implemented method of claim 1, further comprising computing a local divergence as a weighted sum of disagreements in an overall estimation of the feature influences, and the disagreements in the K-ary neighborhood between original data and the embedding.

5. The computer-implemented method of claim 1 wherein the single data-point comprises one of:
    an outlier;
    a single data-point that has a dense neighborhood;
    a single data-point that is misplaced;
    a single data-point that is close to a decision boundary; and
    a single data-point that is a center of any cluster.

6. The computer-implemented method of claim 1, embodied in a cloud-computing environment.

7. The computer-implemented method of claim 1, further comprising generating feature influence explanations based on a result of the calculating.

8. A computer program product for quality determination, the computer program product comprising a computer-readable storage medium having program instructions embodied therewith, the program instructions executable by a computer to cause the computer to perform:
    performing a dimensionality reduction on a high-dimensional dataset to form a dimensional-reduced dataset;
    calculating relative proximities between a selected single data-point and a perturbed neighborhood both for the high-dimensional dataset and in an embedding; and
    determining, using a machine-learning tool executed on a computing device, a quality of the dimensional-reduced dataset based on the relative proximities via a review of an extracted feature extracted from the dimensional-reduced dataset,
    wherein the determining the quality further comprises:
        identifying a K-ary neighborhood for the single data-point using an unsupervised nearest-neighbor search algorithm;
        amplifying the K-ary neighborhood by approximating a locality of the point by sampling a finite number of points uniformly at a random interval around the single data-point; and calculating feature distance contributions and feature influence explanations, the feature influence explanations being obtained as a linear correlation between the feature distance contributions and increasing proximity in the neighborhood.

9. The computer program product of claim 8, wherein the quality of the dimensional-reduced dataset is determined based on an analysis of a first dimension reduction (DR) technique used in the dimensionality reduction.

10. The computer program product of claim 9, further comprising:
using a second dimension reduction technique when performing the dimensionality reduction;
comparing a quality of the second dimension reduction technique with the quality of the first dimension reduction technique; and
displaying, via a graphical user interface, a result of the comparing.

11. The computer program product of claim 8, further comprising computing a local divergence as a weighted sum of disagreements in an overall estimation of the feature influences, and the disagreements in the K-ary neighborhood between original data and the embedding.

12. The computer program product of claim 8, wherein the single data-point comprises one of:
an outlier;
a single data-point that has a dense neighborhood;
a single data-point that is misplaced;
a single data-point that is close to a decision boundary; and
a single data-point that is a center of any cluster.

13. A quality determination system, said system comprising:
a processor; and
a memory, the memory storing instructions to cause the processor to perform:
performing a dimensionality reduction on a high-dimensional dataset to form a dimensional-reduced dataset; and
determining, using a machine-learning tool executed on a computing device, a quality of the dimensional-reduced dataset via a review of an extracted feature extracted from the dimensional-reduced dataset,
wherein the determining the quality further comprises:
selecting a single data-point for analysis;
identifying a K-ary neighborhood for the single data-point using an unsupervised nearest-neighbor search algorithm;
amplifying the K-ary neighborhood by approximating a locality of the point by sampling a finite number of points uniformly at a random interval around the single data-point;
calculating relative proximities between the single data-point and a perturbed neighborhood both for the high-dimensional dataset and in an embedding; and
calculating feature distance contributions and feature influence explanations, the feature influence explanations being obtained as a linear correlation between the feature distance contributions and increasing proximity in the neighborhood.

14. The system of claim 13, wherein the quality of the dimensional-reduced dataset is determined based on an analysis of a first dimension reduction technique used in the dimensionality reduction.

15. The system of claim 14, further comprising:
using a second dimension reduction technique when performing the dimensionality reduction;
comparing a quality of the second dimension reduction technique with the quality of the first dimension reduction technique; and
displaying, via a graphical user interface, a result of the comparing.

16. The system of claim 13, further comprising computing a local divergence as a weighted sum of disagreements in an overall estimation of the feature influences, and the disagreements in the K-ary neighborhood between original data and the embedding.

17. The system of claim 13, wherein the single data-point comprises one of:
an outlier;
a single data-point that has a dense neighborhood;
a single data-point that is misplaced;
a single data-point that is close to a decision boundary; and
a single data-point that is a center of any cluster.

18. The system of claim 13, embodied in a cloud-computing environment.

* * * * *